(12) United States Patent
Sassi et al.

(10) Patent No.: US 11,370,284 B2
(45) Date of Patent: Jun. 28, 2022

(54) MOTOR VEHICLE PROVIDED WITH A PROTECTIVE COVERING SYSTEM

(71) Applicant: ACPV, Paris (FR)

(72) Inventors: Andre Sassi, Rueil Malmaison (FR); Jocelyne Sassi, Rueil Malmaison (FR)

(73) Assignee: ACPV, Paris (FR)

( * ) Notice: Subject to any disclaimer, the term of this patent is extended or adjusted under 35 U.S.C. 154(b) by 165 days.

(21) Appl. No.: 16/614,853

(22) PCT Filed: May 18, 2018

(86) PCT No.: PCT/FR2018/000128
§ 371 (c)(1),
(2) Date: Nov. 19, 2019

(87) PCT Pub. No.: WO2018/215702
PCT Pub. Date: Nov. 29, 2018

(65) Prior Publication Data
US 2020/0094664 A1   Mar. 26, 2020

(30) Foreign Application Priority Data

May 22, 2017  (FR) ........................................ 1754530

(51) Int. Cl.
*B60J 11/02* (2006.01)
*B60J 11/04* (2006.01)

(52) U.S. Cl.
CPC ................ *B60J 11/02* (2013.01); *B60J 11/04* (2013.01)

(58) Field of Classification Search
CPC .............. B60J 11/00; B60J 11/02; B60J 11/04

USPC .......................... 296/136.01, 136.04, 136.1
See application file for complete search history.

(56) References Cited

U.S. PATENT DOCUMENTS

| | | | |
|---|---|---|---|
| 1,804,131 A | 5/1931 | Svihla | |
| 2,723,156 A * | 11/1955 | Stanziale | B60J 11/02 296/98 |
| 4,727,898 A * | 3/1988 | Guma | B60J 11/02 135/87 |

(Continued)

FOREIGN PATENT DOCUMENTS

| | | | |
|---|---|---|---|
| CN | 201922907 U | 8/2011 | |
| JP | 59040942 A * | 3/1984 | B60J 11/02 |

(Continued)

OTHER PUBLICATIONS

Machine language translation of WO 2014128413.*

(Continued)

*Primary Examiner* — D Glenn Dayoan
*Assistant Examiner* — Kevin P Weldon
(74) *Attorney, Agent, or Firm* — Sughrue Mion, PLLC (57) ABSTRACT

A motor vehicle including a rear bumper and a front bumper, and a protective tarpaulin system having a flexible tarpaulin for covering the vehicle and a rear shaft that is installed at the rear bumper, the tarpaulin being windable around the rear shaft. The vehicle is fitted with two longitudinal sheaths a longitudinal slot, a slider being received in each longitudinal sheath and being connected via a traction cable both to a front shaft and to a rear shaft, so that rotating the shafts causes the traction cable to be wound and unwound, thereby moving the slider in the longitudinal sheath, which slider entrains the tarpaulin that is connected to the slider.

20 Claims, 3 Drawing Sheets

(56) References Cited

U.S. PATENT DOCUMENTS

| | | | | |
|---|---|---|---|---|
| 6,672,643 B1 * | 1/2004 | Brodskiy | ................ | B60J 11/02 |
| | | | | 296/136.01 |
| 2005/0212322 A1 * | 9/2005 | Porter | ...................... | B60J 11/02 |
| | | | | 296/98 |
| 2006/0232095 A1 * | 10/2006 | Sedighzadeh | ............ | B60J 11/02 |
| | | | | 296/98 |
| 2013/0214554 A1 * | 8/2013 | Taylor | ...................... | B60J 11/02 |
| | | | | 296/136.01 |
| 2017/0259660 A1 * | 9/2017 | Chaul, Sr. | ................ | B60J 11/02 |

FOREIGN PATENT DOCUMENTS

| | | | | | |
|---|---|---|---|---|---|
| KR | 890009165 Y1 | * | 12/1989 | | |
| KR | 20130074011 A | * | 7/2013 | | |
| WO | 86/04305 A1 | | 7/1986 | | |
| WO | WO-2004060097 | * | 7/2004 | | |
| WO | 2009/124467 A1 | | 10/2009 | | |
| WO | WO-2012004497 A1 | * | 1/2012 | ............. | B60J 11/02 |
| WO | 2014/128413 A1 | | 8/2014 | | |

OTHER PUBLICATIONS

International Search Report for PCT/FR2018/000128 dated Aug. 2, 2018 (PCT/ISA/210).
International Preliminary Report on Patentability and Translation of Written Opinion from the International Machine Bureau in application No. PCT/FR2018/000128 dated Dec. 5, 2019 Translation.

\* cited by examiner

MOTOR VEHICLE PROVIDED WITH A PROTECTIVE COVERING SYSTEM

CROSS REFERENCE TO RELATED APPLICATIONS

This application is a National Stage of International Application No. PCT/FR2018/000128 filed May 18, 2018, claiming priority based on French Patent Application No. 1754530 filed May 22, 2017.

FIELD OF INVENTION

The present invention relates to a motor vehicle, such as a car, provided with a protective tarpaulin system. The vehicle includes an outer body (i.e. its bodywork), a rear bumper, and a front bumper. The protective system comprises a flexible tarpaulin for covering the vehicle body, at least in part, so as to protect it by extending from its rear bumper to its front bumper. The tarpaulin defines a longitudinal direction that extends lengthwise over the vehicle from the rear to the front. In other words, the tarpaulin is extended or pulled in the longitudinal direction so as to cover the vehicle from the rear to the front, or vice versa. Consequently, the advantageous field of application of the present invention is the field of privately-owned cars, but the present invention may also be used with other types of vehicle, e.g. commercial vehicles, coaches, buses, trucks, trailers, boats, etc.

BACKGROUND

Protective tarpaulins for motor vehicles have long been in existence. The simplest models provide only a flexible tarpaulin that is unfolded and pulled over the top of the vehicle so as to cover it, at least in part. Once in place, the tarpaulin may be fastened to the vehicle using various techniques, e.g. rubber bands, hooks, etc. That type of rudimentary protective tarpaulin presents two drawbacks. The first resides in the covering operation that consists in extending the tarpaulin over the top of the vehicle. It is necessary to pass several times around the vehicle in order to position the tarpaulin correctly on the vehicle. The other drawback resides in storing the tarpaulin when it is not in use on the vehicle. It is necessary to fold the tarpaulin correctly so that it is as compact as possible. The storage drawback is solved, in part, by more complex protective tarpaulin systems that use a winding drum onto which the protective tarpaulin is wound in its storage position. When it is desired to use the tarpaulin, it is pulled by a free end in such a manner as to wind the tarpaulin out from its winding drum. Such winding drums may be installed at the front or at the rear, or on the roof of the vehicle. It is also possible to incorporate the winding drum inside the rear trunk or boot of the vehicle. However, even with a winding drum, the tarpaulin system does not solve the problem associated with the operation of covering the vehicle with the tarpaulin. It is still necessary to pull on the free end of the tarpaulin and to move about so as to extend the flexible tarpaulin in appropriate manner over the top of the vehicle. In other words, the winding drum is useful and effective during the operation of winding in the tarpaulin or of uncovering the vehicle, but it is of absolutely no use in the operation of winding out the tarpaulin or of covering the vehicle.

In the prior art, document WO2011/004105 is also known, which describes a protective system comprising a tarpaulin that is provided with stiffener elements, in the form of metal strips or inflatable hoses, that extend substantially in the longitudinal direction so as to impart a certain amount of stiffness to the flexible tarpaulin so as to make the operation of covering the vehicle with a tarpaulin easier. A traction cable mounted on a winder makes it possible to pull the tarpaulin during the operation of putting the tarpaulin into place. The stiffener elements increase the thickness of the tarpaulin and turn out to be ineffective, in particular when there is wind.

Document U.S. Pat. No. 4,432,581 is also known, which describes a protective tarpaulin system comprising a tarpaulin that is windable on a motor-driven drum that is arranged in the rear bumper. The free edge of the tarpaulin is provided with two cables, wires, or lines that are connected to a motor-driven traction shaft that is arranged in the front bumper of the vehicle. In order to guide the tarpaulin in the longitudinal direction, its bottom face facing the bodywork is provided with two upsidedown T-shaped rails each of which comes into engagement in a series of eight guides with wheels that are fastened on the bodywork. By activating the motor-driven traction shaft, the cables are pulled and the tarpaulin begins to cover the vehicle while being guided by the rails that are engaged in the guides. That protective tarpaulin system suffers from numerous major drawbacks. Firstly, the rails increase the stiffness of the tarpaulin, making it more difficult to wind on the drum. In addition, the rails increase the thickness of the tarpaulin, resulting in a wound diameter that is even greater. Furthermore, the rails come into rubbing contact with the bodywork, resulting in the paint becoming worn. Finally, the two series of eight guides fastened on the bodywork degrade the appearance of the vehicle.

Document WO 2014/128413 is also known, which describes another protective tarpaulin system comprising a tarpaulin having a free edge that includes at least one traction element made of ferromagnetic material, and the vehicle includes at least one movable magnet that is movable below the outer body along a traction path that extends in the longitudinal direction, the movable magnet attracting the traction element of the tarpaulin through the outer body and entraining the traction element of the tarpaulin with it along the traction path, so as to bring the tarpaulin into its unwound covering position by sliding over the outer body. However, that magnetic protective tarpaulin system also suffers from several major drawbacks. Firstly, the magnetic connection can sometimes turn out to be insufficient, such that the tarpaulin may become detached. Furthermore, as a result of the magnetic attraction, the tarpaulin rubs hard against the bodywork, resulting in the paint quickly becoming worn. Finally, the magnetic system prevents the bodywork from being made of steel, and this increases the cost of the vehicle.

Certain Objects of the Invention

An object of the present invention is to remedy the above-mentioned drawbacks of the prior art by defining a more industrialized protective tarpaulin system that is reliable and effective, and that does not degrade the paint of the bodywork or the appearance of the vehicle.

SUMMARY OF THE INVENTION

To achieve these various objects, the protective tarpaulin system of the present invention proposes that the vehicle is fitted with two longitudinal sheaths that extend along the outer body, each longitudinal sheath including a longitudinal slot, a slider being received in each longitudinal sheath, each slider being provided with a traction member that is connected to the free edge of the tarpaulin and that extends through the longitudinal slot, each slider also being connected via a cable both to a front shaft that is installed at the front bumper of the vehicle, and to a rear shaft that is installed at the rear bumper of the vehicle, so that rotating the shafts causes the cable to wind and unwind, thereby moving the slider in the longitudinal sheath, which slider entrains the tarpaulin that is connected at its free edge to the traction member of the slider. It can be said that the protective tarpaulin system of the present invention results from a synergetic combination of the protective tarpaulin systems in documents U.S. Pat. No. 4,432,581 and WO 2014/128413, preserving all of their advantages and eliminating all of their drawbacks. Specifically, the spirit of the longitudinal guiding sheaths for guiding for magnets in document WO 2014/128413 is preserved, but the technique has been improved so as to eliminate the problems associated with loss of connection and with damage to the paint, by providing the longitudinal slot that enables the tarpaulin to be connected mechanically. The general concept of mechanical guidance in document U.S. Pat. No. 4,432,581 is reproduced, but it has been improved by transferring the longitudinal guidance of the rails to the bodywork, and by transferring the localized guidance of the two series of eight guides from the bodywork to the free edge of the tarpaulin. In this way, all of the drawbacks of the two protective tarpaulin systems of the prior art are eliminated.

It should also be observed that winding and unwinding the cable both on a front shaft and on a rear shaft makes it possible to move the slider in optimum manner while holding the tarpaulin correctly, not only during covering, but also during uncovering. In the absence of the rear shaft for the cable, the tarpaulin would have to pull the slider during uncovering, and this would create harmful tension on the tarpaulin. Winding and unwinding the cable on two shafts makes it possible to maintain a controlled and constant tension on the cable, and thus move the slider highly accurately, independently of the connection between the tarpaulin and the slider.

Advantageously, the longitudinal sheath is flexible and is mounted in removable manner, advantageously by snap-fastening, in a longitudinally-extruding gap or channel formed by the outer body (bodywork), the removable longitudinal sheath advantageously being fitted with its slider and with its cable. Thus, it is possible to replace the longitudinal sheath easily, in particular when it is damaged or when its slider is blocked. This operation may be performed by a person who is not qualified, such as the driver of the vehicle. Specifically, it suffices to release the cable from the two shafts and to remove the longitudinal sheath by extricating it from the longitudinally-extruding gap. The new longitudinal sheath can thus be put into place by inserting it into the longitudinally-extruding gap, then by fastening the ends of the cable to the two shafts.

Preferably, the longitudinal sheath extends mainly under the outer body inside the vehicle, so as to project very little, if at all, from the outer body towards the outside of the vehicle. In a non-preferred variant, the longitudinal sheath may alternatively extend mainly above the outer body at the outside of the vehicle.

In a practical embodiment, the longitudinal slot may be provided with a closure system that is forced into an open state by the traction member. The closure system may be a brush or two touching lips that the traction member deforms while passing between them.

According to an advantageous characteristic, a control system controls, in optimum manner, the winding and unwinding of the cables and of the tarpaulin simultaneously. Preferably, the control system comprises a clutch-brake that is mounted on each shaft, and an automatic controller for controlling, in coordinated manner, the two clutch-brakes, so as to adjust the winding and unwinding speeds of the cables and of the tarpaulin in such a manner as to co-ordinate the travel of the sliders in their respective longitudinal sheaths with the winding and unwinding of the tarpaulin on the winding drum. The system makes it possible to ensure that the tarpaulin and the cables wind correctly, without creating any offset (an advance or a delay). There would be no need for the control system if the cables were not connected both to the front shaft and to the rear shaft. The sliders do not follow the tarpaulin passively while it is being removed, but, on the contrary, they guide it, so that the tarpaulin and the cables are wound correctly onto the rear shaft.

In another advantageous aspect of the invention, a portion of the rear shaft, comprising the winding drum with the tarpaulin wound thereon, may be mounted in removable manner in the rear bumper, so as to make it possible to replace the tarpaulin easily and quickly, the rear bumper advantageously being fitted with an access flap. Thus, the driver can replace this shaft portion, in the event of the tarpaulin or the shaft deteriorating.

In a practical aspect, the tarpaulin leaves the rear bumper through a slot that is fitted with a brushing system for cleaning the tarpaulin before it is wound in.

In another practical aspect, the tarpaulin is provided with magnetic or ferromagnetic elements that are suitable for co-operating with corresponding magnetic or ferromagnetic elements that are secured to the vehicle so as to flatten the tarpaulin against the outer body, the magnetic attraction advantageously being amplified by an electromagnetic start pulse.

According to another advantageous characteristic of the invention, the vehicle further comprises a photovoltaic tarpaulin system that is similar or identical to the protective tarpaulin system. This optional system also comprises two shafts, two sheaths that are housed in two channels, two sliders, and two cables. The two tarpaulin systems are superposed and they may be used independently of each other.

The spirit of the invention resides in simultaneously pulling and guiding the tarpaulin by means of a slotted sheath that makes it possible to connect the tarpaulin mechanically to a slider that can be moved in the sheath by means of a windable cable.

BRIEF DESCRIPTION OF THE DRAWINGS

The invention is described more fully below with reference to the accompanying drawings which show several embodiments of the invention by way of non-limiting example.

In the figures.

DETAILED DESCRIPTION OF NON-LIMITING EMBODIMENTS

Figure 1:
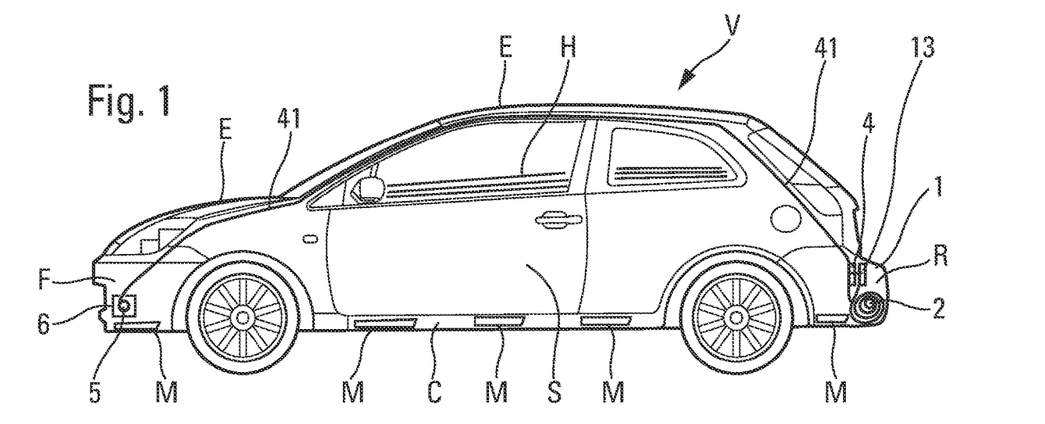
FIGS. 1 and 2 are side views of a vehicle fitted with a protective tarpaulin system of the invention, respectively with the tarpaulin removed and while the vehicle is being covered with the tarpaulin.
Figure 2:
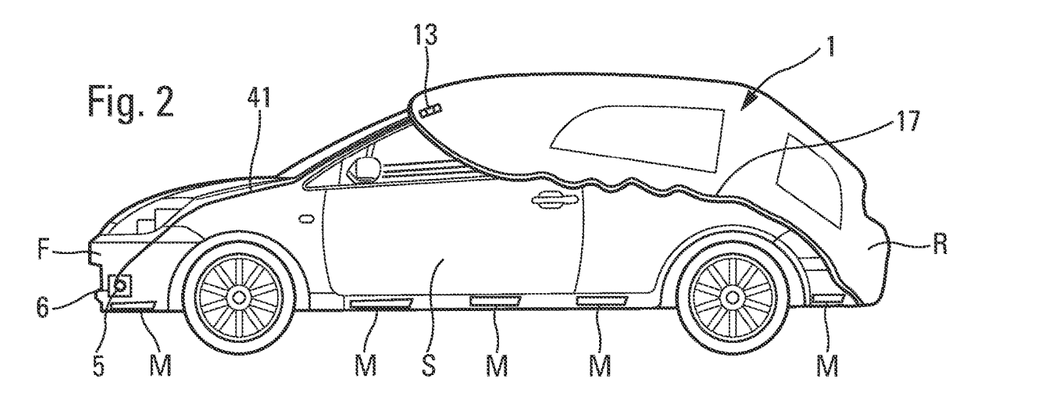
Figure 3:
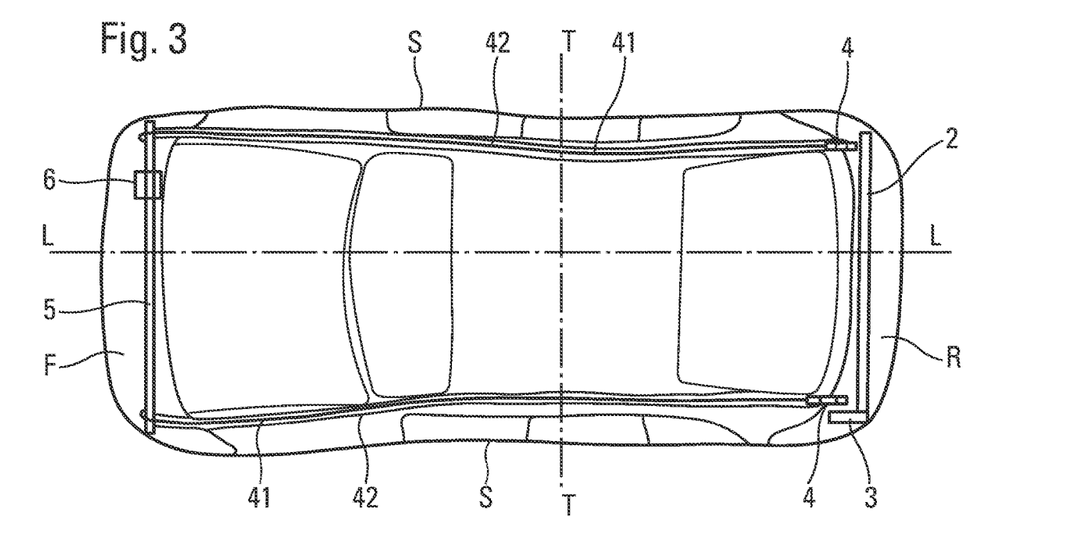
FIG. 3 is a plan view of the FIG. 1 vehicle.
Figure 4:
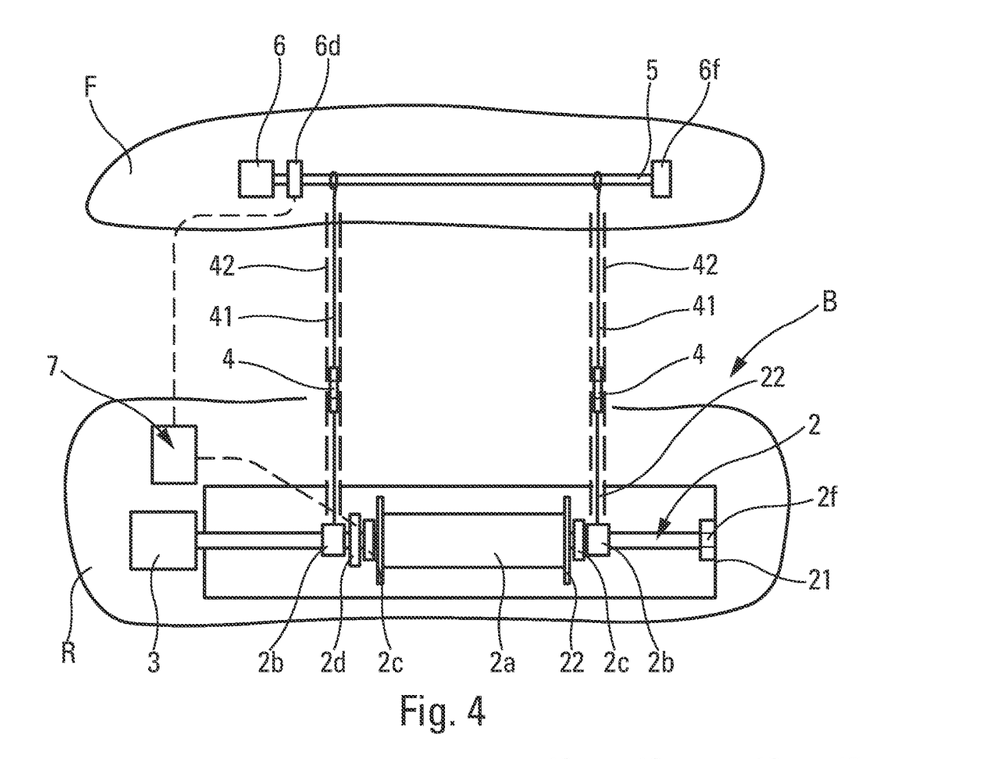
FIG. 4 is a very diagrammatic view of the tarpaulin system of the invention.

The protective tarpaulin system of the present invention is for associating with or incorporating in a motor vehicle, such as a privately-owned car or a commercial vehicle, a truck, a trailer, or even a boat. It is even possible to envisage using the tarpaulin system of the invention to cover other optionally-movable objects, and even structures, e.g. a pool, a swimming pool, etc. In FIGS. 1 to 3 that are used to illustrate the present invention, the tarpaulin system is incorporated in a motor vehicle of the privately-owned type. In conventional manner, the vehicle V comprises a sill C, a plurality of wheels, an engine, and a body. The vehicle V also comprises a rear bumper R, an outer body E, and a front bumper F, as can be seen in FIG. 1. The outer body E of the vehicle, for being covered with a tarpaulin at least in part by the tarpaulin system of the invention, is essentially constituted by the bodywork that forms the rear tailgate or trunk, the roof, the hood, the doors, and the fenders, and portions of the rear and front bumpers. The outer body E is also constituted by windows. The tarpaulin system of the invention may cover all of the outer body E, including the rear bumper and possibly portions of the wheels down to the height of the sill. This is merely one non-limiting embodiment.

The protective tarpaulin system of the present invention comprises a rear shaft 2 that is arranged in the rear bumper R, a tarpaulin 1 that is engaged with the rear shaft 2, a front shaft 5 that is arranged in the front bumper F, and two longitudinal sheaths 42 that extend substantially in parallel from the rear bumper R to the front bumper F along the outer body E. By way of example, each longitudinal sheath 42 may extend from the front bumper F along the front fenders, beside the windscreen, along the roof, and along the rear fenders to the rear bumper R. In each longitudinal sheath 42, a slider 4 is slidably mounted, so as to be suitable for moving without excessive friction. The slider 4 may present any appropriate shape, e.g. the shape of a shuttle with a rounded smooth body and two tapering ends. The slider 4 is provided with a traction cable 41 that may also be referred to as a wire, a line, a cord, etc. The cable 41 extends from both ends of the slider 4 and may even pass through it.

Figure 5:
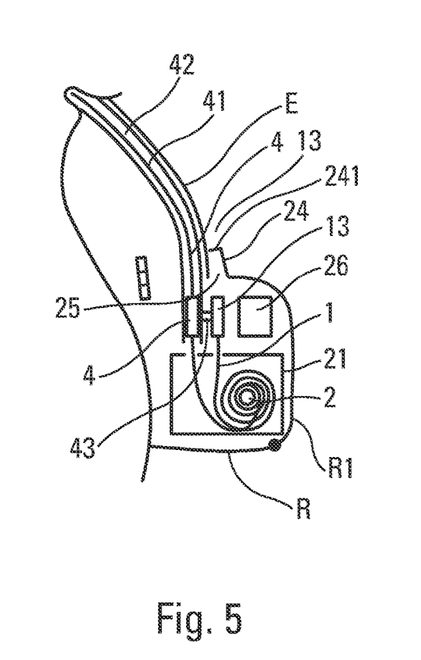
FIG. 5 is a vertical section view through the rear portion of the vehicle, showing the system of the invention.

As can be seen in greater detail in FIG. 5, the rear shaft 2 includes a tarpaulin winding and unwinding drum 2a, and two cable winding and unwinding drums 2b. The rear shaft 2 is rotated by a motor 3 that is preferably electrical, and that is mounted at one end of the shaft 2. The other end of the shaft 2 is mounted in a free-wheel bearing 2f, so as to make it possible to turn the shaft manually when the motor is switched off and disengaged. A central portion of the rear shaft 2, including the drum 2a, is advantageously mounted in removable manner on two bearings 2c, so that it can be removed easily from the bearings 2c and extracted from the casing 2, and then from the rear bumper R through a hinged flap R1, shown in FIG. 5. This manipulation may be performed by anyone, such as the driver of the vehicle. This removable portion of the shaft 2 is advantageously made of plastics material. Advantageously, a clutch-brake 2d is also provided that makes it possible to uncouple the rotation of the drum 2a from the rotation of the drums 22b, as described below. The clutch-brake 2d is advantageously mounted on the shaft 2 between the drum 2b and the bearing 2c. Thus, the removable portion of the shaft 2 is limited to the drum 2a.

The rear shaft 2 is housed in a casing 21 that defines an inside space that is sufficient to receive the wound tarpaulin 1. The rear shaft 2, its motor 3, and its casing 21 are housed entirely inside the rear bumper R, as can be seen in the figures.

In the invention, both traction cables 41 are fastened via one end to the rear shaft 2, so that they can be wound onto, and unwound from, their respective drums 2b, as a function of the direction of rotation of the shaft.

The tarpaulin 1 leaves the rear bumper R through an elongate opening 25 that is advantageously provided with a pivotable cover 24 that is provided with a brush 241 for cleaning the tarpaulin before it is wound into the rear bumper R. Instead of the brush 241 mounted on the cover 24, any brushing or cleaning system could be provided for removing dirt that has become deposited on the outside face of the tarpaulin 1. The tarpaulin may be urged towards the outer body E with the help of the cover 24 acting as a deflector.

Figure 6:
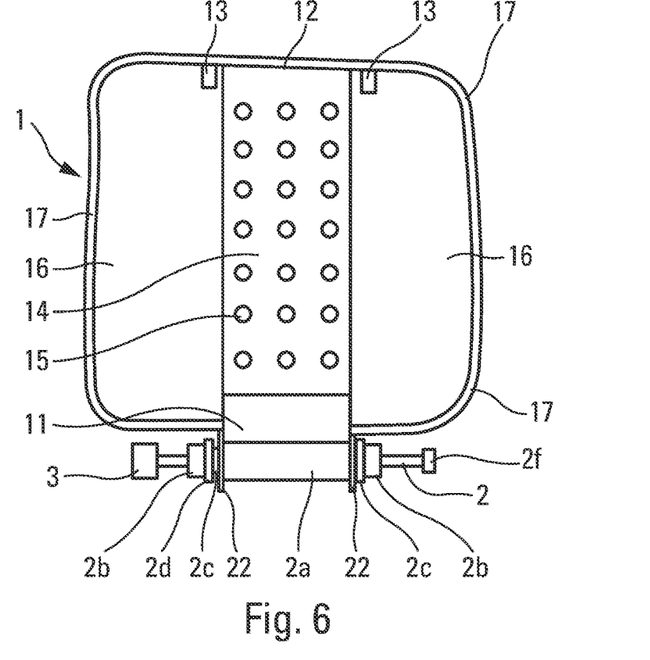
FIG. 6 is a diagrammatic view of the tarpaulin of the invention.

The tarpaulin 1 of the invention can be seen in FIG. 6. It may be made from any flexible film or sheet that presents small thickness. Numerous materials, in particular plastics materials, are suitable for making a tarpaulin 1 of the invention. A non-stick or dirt-proof treatment (e.g. by nanotechnology) is advantageous. The dimensions (width, length) of the tarpaulin are adapted as a function of the size of the vehicle that it is to cover. By way of example, it is possible to provide a tarpaulin that is 5.60 meters (m) long and 3.80 m wide. The tarpaulin 1 includes a longitudinal central zone 14 that is advantageously provided with photovoltaic cells 15. The cells 15 are fully effective in sunlight, but they are also effective in shade providing there is some minimum amount of light. The zone 14 may extend over the hood, the windscreen, the roof, and the rear trunk or tailgate of the vehicle. On either side of the zone 14, the tarpaulin forms flaps 16 that may be more flexible than the zone 14 that is provided with photovoltaic cells 15. The flexible flaps 16 are for covering the sides of the vehicle, and in particular the fenders and the doors. The flaps 16 may also be provided with means for capturing solar energy, such as photovoltaic fibers for example.

The tarpaulin 1 includes a connection edge 11 that is connected to the rotary drum 2b between the two end plates 22. It should be observed that the width of the zone 14 corresponds substantially to the spacing between the two end plates 22. Thus, the zone 14 winds onto the rotary drum 2 between the end plates 22, whereas the flexible side flaps 16 are wound onto the rotary shaft 2 outside the end plates 22. Given that the zone 14 is covered, at least in part, with photovoltaic cells 15, it presents relative stiffness that is greater than the stiffness of the flexible flaps 16. It is thus advantageous to wind the zone 14 around the drum 2 like a roller blind so as to avoid creasing it. It does not really matter if the flaps 16 become creased, since they are very flexible.

The tarpaulin 1 also defines a free edge 12 that is opposite from the connection edge 11. In the invention, the free edge 12 is provided with two fastener elements 13, as can be seen in FIG. 6. Each fastener element 13 may be in the form of a plate that is anchored securely to the tarpaulin and that includes fastener means in the form of a housing suitable for receiving a tab or a blade.

According to another advantageous characteristic, the periphery of the tarpaulin 1 is provided with at least one ferromagnetic insert 17 that, by way of example, may be in the form of a continuous ferromagnetic strip that is sewn into a peripheral hem of the tarpaulin. The strip is held flattened against the outer body E over the sill C of the vehicle, and even over the front and rear bumpers, which are provided with stationary magnets M that may be permanent magnets or electromagnets. Thus, the side flaps 16 of the tarpaulin are held flattened against the outer body E, even in the event of wind. For electromagnets, a start pulse of higher current makes it possible to increase the magnetic attraction force momentarily, so as to help the strip flatten against the stationary magnets M.

In the invention, each fastener element 13 is connected to a respective one of the two sliders 4, which are themselves arranged in respective ones of the two longitudinal sheaths 42. More precisely, each longitudinal sheath 42 is slotted over its entire length, possibly except at its two ends. Thus, the longitudinal sheath 42 defines a hollow inside 420 that communicates with the outside through a longitudinal slot 422 that opens out to the outside face of the outer body E. The width of the longitudinal slot 42 is preferably as small as possible for reasons of appearance: it may be less than 1 millimeter (mm). It is thus practically invisible. Advantageously, the longitudinal sheath 42 is arranged entirely, or almost entirely, under the outer body E, as can be seen in FIGS. 7a and 7b.

Figure 7A:
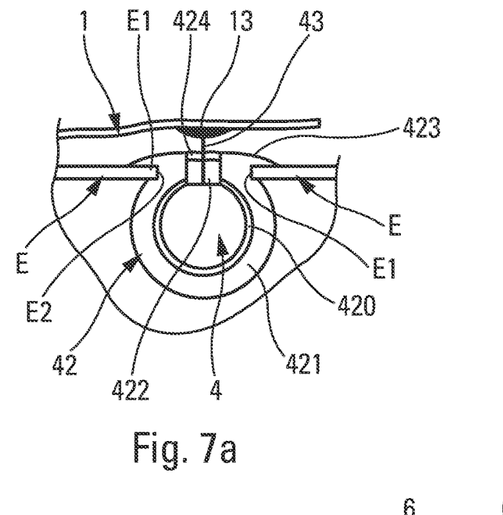
FIGS. 7a and 7b are diagrammatic section views showing two embodiments for a longitudinal sheath of the invention.

In FIG. 7a, the outer body E is merely interrupted so as to define two adjacent opposite edges. The longitudinal sheath 42 forms a sheath body 421 that defines the hollow inside 420, with the longitudinal slot 422 formed at its top. On either side of the slot 422, the sheath 42 forms two lips 423 that come to bear, advantageously in sealed manner, against the top outside face of the adjacent opposite edges E1. The longitudinal sheath 42 is thus held, in particular by snap-fastening, in a longitudinally-extruding gap E2 that is defined between the two adjacent opposite edges E1.

Figure 7B:
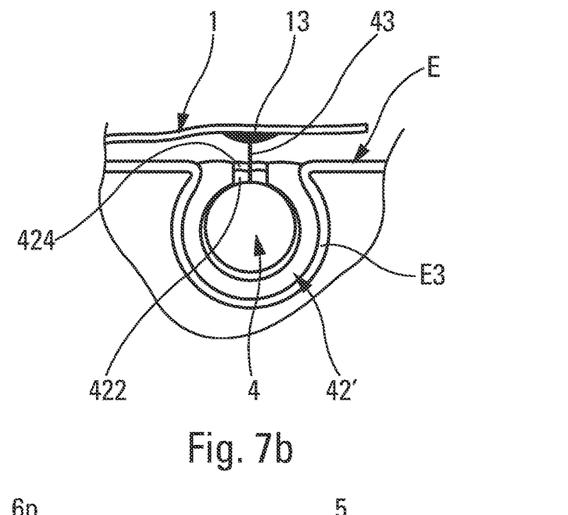

In FIG. 7b, the outer body E forms a longitudinal channel E3 that receives a slotted longitudinal sheath 42', which does not project above the outer body E.

Advantageously, the longitudinal slot 422 may be provided with a closure system 424 that may be in the form of a brush or touching lips.

In the invention, the slider 4 that is received in the longitudinal sheath 42, 42' is connected to a fastener element 13 of the tarpaulin via a traction member 43 which passes through the longitudinal slot 422. The traction member 43 may be in the form of a pin, a tab, a peg, a rod, a blade, a plate, etc. The traction member 43, which may be secured to the slider 4 or which may be made integrally therewith, co-operates in releasable manner with the fastener means of the fastener element 13, so as to be able to disengage the tarpaulin 1 from the slider 4.

In the completely wound-in storage position, the fastener elements 13 may be arranged and held below the elongate opening 25 in the rear bumper R, as can be seen in FIG. 5. The final position of the fastener elements 13 in the rear bumper R may be determined by means of a proximity or presence sensor 26.

At the front bumper F, the front shaft 5 is arranged parallel to the rear shaft 2. The shaft 5 is driven in rotation about its own axis on a free wheel bearing 6f, by a motor 6. A clutch-brake 6d is advantageously provided on the front shaft 5. Both traction cables 41 are fastened at one end to the rotary shaft 5 so that they can be wound onto, and unwound from, the front shaft 5, as a function of its direction of rotation. Advantageously, an end-of-stroke detector or sensor is provided in order to stop winding the two cables 41, once the tarpaulin 1 covers the vehicle entirely.

Thus, the sliders 4 are movable inside the longitudinal sheaths 42 by winding and unwinding the traction cables 41 on the rear and front shafts 2 and 5, respectively driven by the motors 3 and 6. In the start position in FIG. 5, the sliders 4 are arranged in the proximity of the longitudinal opening 25 of the rear bumper R. The fastener elements 13 of the tarpaulin 1 that are connected to the sliders via the traction members 43 are also situated just below the longitudinal opening 25. As a result of this direct mechanical connection, the movement of the sliders 4 entrains movement of the fastener elements 13, which thus leave the rear bumper R through the longitudinal opening 25. In this way, the traction members 43 move in the longitudinal slots 422, pushing apart the optional closure systems 424. An automatic controller 7 is advantageously provided for controlling, in coordinated manner, the two clutch-brakes 2d and 6d, so as to adjust the winding and unwinding speeds of the cables 41 and of the tarpaulin 1 in such a manner as to co-ordinate the travel of the sliders 4 in their respective longitudinal sheaths 42 with the winding and unwinding of the tarpaulin 1 on the winding drum 2a. This co-ordination is necessary in order to avoid creating an offset or a delay between winding the tarpaulin and winding and unwinding the traction cables 41. The controller 8 and the two clutch-brakes 2d and 6d thus form a control system that makes it possible to manage, in optimum manner, the winding and unwinding of the cables 41 and of the tarpaulin 1 simultaneously. It should be observed that the two clutch-brakes 2d and 6d could be replaced by variable-speed motors.

The operation of putting the tarpaulin into place thus continues until the sliders 4 and the fastener elements 13 reach the front bumper F. The vehicle is thus completely covered with a tarpaulin, with the photovoltaic cells 15 of the central zone 14 being deployed on top of the vehicle, and with the side flaps 16 surrounding the sides of the vehicle. The tarpaulin 1 is thus held in place on the vehicle firstly by the fastener elements 13 that are connected to the sliders 4, and secondly by the stationary magnets M that are provided in the sill and that co-operate with the ferromagnetic strip 17.

During the operation of removing the tarpaulin, the motors 3 and 6 are once again operated in coordinated manner, so as to wind the tarpaulin 1 and the cables 41 onto the shaft 2. To do this, the front shaft 5 must be driven in such a manner as to keep the traction cables 41 under no or very little tension. The sliders 4 no longer perform a traction function, as during the operation of putting the tarpaulin into place, but merely a longitudinal guiding function, so that the tarpaulin winds properly onto the drum 2a, without being laterally offset. Once the operation of removing the tarpaulin has been performed, the tarpaulin has returned to the configuration shown in FIG. 5. The end of the operation is controlled by the proximity detector 26 that detects the fastener elements 13.

It should be observed that the fastener elements 13 are still situated above the longitudinal sheaths 42, either out of contact or in contact therewith. Either way, the fastener elements 13 never come into contact with the outer body E, such that there is no risk of deterioration by rubbing.

Figure 8:
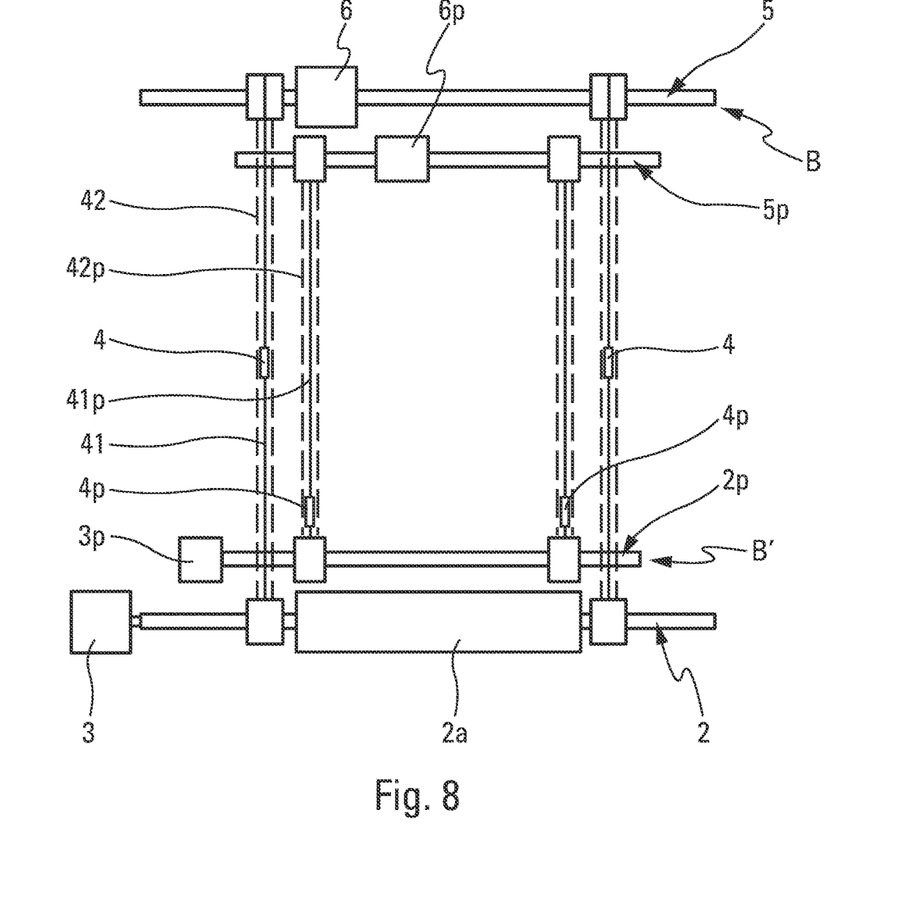
FIG. 8 is a very diagrammatic representation of an embodiment using two tarpaulin systems (a protective tarpaulin system and a photovoltaic tarpaulin system).

FIG. 8 shows, very diagrammatically, a duplicated version in which two identical or similar tarpaulin systems are used in interfitted or superposed manner. One of the tarpaulin systems is the above-described system, i.e. a protective tarpaulin system, but without any photovoltaic cells, and the other tarpaulin system is a photovoltaic tarpaulin system. The tarpaulin of the protective tarpaulin system presents dimensions that are comparable to those of the tarpaulin system in FIG. 6, while the photovoltaic tarpaulin presents dimensions that are identical or similar to those of the central zone 14 in FIG. 6. The two tarpaulin systems may be actuated simultaneously or individually.

The present invention is illustrated by means of embodiments that use two sheaths 42, two sliders 4, two fastener elements 13, and two traction cables 41. However, it is possible to envisage other embodiments with a single sheath, or, on the contrary, with more than two sheaths. The sheaths 42 are inserted into grooves of the outer body. However, it is possible to envisage fastening the sheaths on the outer body, e.g. with adhesive.

The protective tarpaulin system of the present invention thus presents the following advantages:
  Guided traction of the tarpaulin without risk of deteriorating the outer body (paint of the bodywork);
  Guided traction of the tarpaulin with mechanical hold, and without the tarpaulin having extra thickness;
  Removable and thus replaceable sheath (with slider and traction cable); and
  Removable and thus replaceable rear shaft (with wound tarpaulin).

By means of the invention, a protective tarpaulin system is obtained that finds an application that is simple and industrializable.

The invention claimed is:

1. A motor vehicle defining a longitudinal direction that extends over a length of the vehicle between a rear bumper and a front bumper, the vehicle including an outer body that extends substantially from the rear bumper to the front bumper, the vehicle also being provided with a protective tarpaulin system comprising a flexible tarpaulin for covering the outer body of the vehicle at least in part so as to protect the outer body, the system further comprising a rear shaft that is installed at the rear bumper of the vehicle, the tarpaulin being windable around the rear shaft, the tarpaulin including a connection edge that is secured to the rear shaft, and an opposite edge that is free, the vehicle being fitted with two longitudinal sheaths that extend along the outer body, a slider being received in each longitudinal sheath;
  wherein each longitudinal sheath includes a longitudinal slot, each slider being provided with a traction member that is connected to the free edge of the tarpaulin and that extends through the longitudinal slot, each slider also being connected via a traction cable both to a front shaft that is installed at the front bumper of the vehicle, and also to the rear shaft that is installed at the rear bumper of the vehicle, so that rotating the front and rear shafts causes the traction cable to be wound and unwound, thereby moving the slider in the longitudinal sheath, which slider entrains the tarpaulin that is connected at the free edge to the traction member of the slider;
  wherein the longitudinal sheath is flexible and is mounted in removable manner in a longitudinally-extruding gap formed by the outer body.

2. The motor vehicle according to claim 1, wherein the removable longitudinal sheath is fitted with its slider and with its cable.

3. The motor vehicle according to claim 1, wherein the longitudinal sheath extends mainly under the outer body inside the vehicle, so as to project very little or not at all from the outer body towards the outside of the vehicle.

4. The motor vehicle according to claim 1, wherein the longitudinal slot is provided with a closure system that is forced into an open state by the traction member.

5. The motor vehicle according to claim 1, wherein a control system controls, in optimum manner, the winding and unwinding of the cables and of the tarpaulin simultaneously.

6. The motor vehicle according to claim 5, wherein the control system comprises a clutch-brake that is mounted on each shaft, and an automatic controller for controlling, in coordinated manner, the two clutch-brakes, so as to adjust the winding and unwinding speeds of the cables and of the tarpaulin in such a manner as to co-ordinate the travel of the sliders in their respective longitudinal sheaths with the winding and unwinding of the tarpaulin on the winding drum.

7. The motor vehicle according to claim 1, wherein the tarpaulin leaves the rear bumper through an opening that is fitted with a brushing system for cleaning the tarpaulin before it is wound in.

8. The motor vehicle according to claim 1, wherein the tarpaulin is provided with magnetic or ferromagnetic elements that are suitable for co-operating with corresponding magnetic or ferromagnetic elements that are secured to the vehicle so as to flatten the tarpaulin against the outer body, the magnetic attraction advantageously being amplified by an electromagnetic start pulse.

9. The motor vehicle according to claim 1, further comprising a photovoltaic tarpaulin system that is similar or identical to the protective tarpaulin system.

10. The motor vehicle according to claim 1, wherein the longitudinal sheath is mounted in removable manner by snap-fastening.

11. A motor vehicle defining a longitudinal direction that extends over a length of the vehicle between a rear bumper and a front bumper, the vehicle including an outer body that extends substantially from the rear bumper to the front bumper, the vehicle also being provided with a protective tarpaulin system comprising a flexible tarpaulin for covering the outer body of the vehicle at least in part so as to protect the outer body, the system further comprising a rear shaft that is installed at the rear bumper of the vehicle, the tarpaulin being windable around the rear shaft, the tarpaulin including a connection edge that is secured to the rear shaft, and an opposite edge that is free, the vehicle being fitted with two longitudinal sheaths that extend along the outer body, a slider being received in each longitudinal sheath;
  wherein each longitudinal sheath includes a longitudinal slot, each slider being provided with a traction member that is connected to the free edge of the tarpaulin and that extends through the longitudinal slot, each slider also being connected via a traction cable both to a front shaft that is installed at the front bumper of the vehicle, and also to the rear shaft that is installed at the rear bumper of the vehicle, so that rotating the front and rear shafts causes the traction cable to be wound and unwound, thereby moving the slider in the longitudinal sheath, which slider entrains the tarpaulin that is connected at the free edge to the traction member of the slider
  wherein a portion of the rear shaft, comprising the winding drum with the tarpaulin wound thereon, is mounted in removable manner in the rear bumper for easy and quick replacement of the tarpaulin.

12. The motor vehicle according to claim 11, wherein the rear bumper is fitted with an access flap.

13. The motor vehicle according to claim 11, wherein the longitudinal sheath extends mainly under the outer body inside the vehicle, so as to project very little or not at all from the outer body towards the outside of the vehicle.

14. The motor vehicle according to claim 11, wherein the longitudinal slot is provided with a closure system that is forced into an open state by the traction member.

15. The motor vehicle according to claim 11, wherein a control system controls, in optimum manner, the winding and unwinding of the cables and of the tarpaulin simultaneously.

16. The motor vehicle according to claim 15, wherein the control system comprises a clutch-brake that is mounted on each shaft, and an automatic controller for controlling, in coordinated manner, the two clutch-brakes, so as to adjust the winding and unwinding speeds of the cables and of the tarpaulin in such a manner as to co-ordinate the travel of the sliders in their respective longitudinal sheaths with the winding and unwinding of the tarpaulin on the winding drum.

17. The motor vehicle according to claim 11, wherein the tarpaulin leaves the rear bumper through an opening that is fitted with a brushing system for cleaning the tarpaulin before it is wound in.

18. The motor vehicle according to claim 11, wherein the tarpaulin is provided with magnetic or ferromagnetic elements that are suitable for co-operating with corresponding magnetic or ferromagnetic elements that are secured to the vehicle so as to flatten the tarpaulin against the outer body, the magnetic attraction advantageously being amplified by an electromagnetic start pulse.

19. The motor vehicle according to claim 11, further comprising a photovoltaic tarpaulin system that is similar or identical to the protective tarpaulin system.

20. The motor vehicle according to claim 11, wherein the longitudinal sheath is flexible and is mounted in removable manner in a longitudinally-extruding gap formed by the outer body.

* * * * *